(12) United States Patent
Xie

(10) Patent No.: US 9,751,773 B1
(45) Date of Patent: Sep. 5, 2017

(54) AMMONIA SYNTHESIS SYSTEM AND METHOD

(71) Applicant: Hunan Anchun Advanced Technology Co., Ltd, Changsha (CN)

(72) Inventor: Dingzhong Xie, Changsha (CN)

(73) Assignee: Hunan Anchun Advanced Technology Co., Ltd., Changsha (CN)

(*) Notice: Subject to any disclaimer, the term of this patent is extended or adjusted under 35 U.S.C. 154(b) by 0 days.

(21) Appl. No.: 15/426,931

(22) Filed: Feb. 7, 2017

(51) Int. Cl.
*C01C 1/04* (2006.01)
*B01J 8/04* (2006.01)
*B01J 19/24* (2006.01)

(52) U.S. Cl.
CPC ............ *C01C 1/0452* (2013.01); *B01J 8/048* (2013.01); *B01J 8/0426* (2013.01); *B01J 8/0492* (2013.01); *B01J 8/0496* (2013.01); *B01J 19/245* (2013.01); *C01C 1/0417* (2013.01)

(58) Field of Classification Search
CPC ........ B01J 8/0426; B01J 8/0453; B01J 8/048; B01J 8/0496; B01J 8/0492; C01C 1/0452; C01C 1/0417
See application file for complete search history.

(56) References Cited

U.S. PATENT DOCUMENTS 6,214,296 B1 * 4/2001 Lou ................ B01J 8/0214
422/148
2016/0200572 A1 7/2016 Xie

FOREIGN PATENT DOCUMENTS

| CN | 89104239.3 A | 2/1990 |
| CN | 200910227101.1 A | 8/2010 |
| CN | 202149472U A | 2/2012 |
| CN | 201210377596.8 A | 1/2013 |

* cited by examiner

*Primary Examiner* — Lessanework Seifu
(74) *Attorney, Agent, or Firm* — Timothy T. Wang; Ni. Wang & Massand, PLLC

(57) ABSTRACT

In one embodiment, an ammonia synthesis system comprising, an ammonia synthesis reactor, a waste heat boiler, a supply water heat exchanger, a recycle gas heat exchanger, a water cooler, an ammonia chiller and refrigeration exchanger, a secondary ammonia chiller, an ammonia separator, a liquid ammonia tank, a recycle compressor and a start-up heater, and wherein, a process gas is heated in the recycle gas heat exchanger and enters the ammonia synthesis reactor and the waste heat boiler, a reacted gas stream exits from a bottom of the waste heat boiler and is cooled in the supply water heat exchanger, a gas stream enters the recycle gas heat exchanger, the water cooler, the ammonia chiller and refrigeration exchanger, the secondary ammonia chiller, and is cooled, the gas stream enters the ammonia separator to form a separate liquid ammonia and the separated liquid ammonia enters the liquid ammonia tank.

10 Claims, 6 Drawing Sheets

AMMONIA SYNTHESIS SYSTEM AND METHOD

FIELD

This disclosure relates to the field of chemical engineering and more particularly to an ammonia synthesis reaction and method.

BACKGROUND

The reaction equation for ammonia synthesis is as follows:

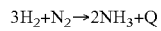

Synthesis of ammonia reaction is a reversible reaction that is carried out in a reactor with a catalyst. The catalyst activity occurs within a temperature range, generally 340° C.~520° C., at a temperature lower than 340° C. the reaction rate slows and at a temperature higher than 520° C., the catalyst loses activity to some degree due to crystal growing within The ammonia reaction is an exothermic reaction, therefore, heat exchanger is needed within in the reactor to remove excess thermal energy, to maintain the temperature of the reacted gas lower than ≤520° C., while keeping the un-reacted gas heated to ≥340° C.

The reaction rate is related to the reaction driving force, which is the difference between the reaction temperature and the equilibrium temperature within the catalyst activation temperature range. The greater the difference, the greater the reaction driving force, and the greater the reaction rate. Since the equilibrium temperature lowers as the reaction progresses, the reaction temperature in the later stages of the catalyst lifetime is lowered.

FIG. 1 is a prior art ammonia synthesis system and process. The system has an indirect heat exchange ammonia reactor 200, in which the ammonia reactor 200 is a separate unit from the waste heat boiler 202. The ammonia synthesis system comprises an ammonia reactor 200, a steam super-heater 201, a waste heat boiler 202, a supply water heater 203, a recycle gas heat exchanger 201, a water cooler 205, a refrigeration exchanger 206, a first ammonia chiller 207, a second ammonia chiller 208, a horizontal ammonia separator 209, a liquid ammonia tank 210 and a recycle compressor 211.

The prior art process in this ammonia synthesis system has an un-reacted gas stream that exits from a recycle gas heat exchanger and that splits to three streams, which enter the ammonia reactor. The reacted hot gas stream exits the ammonia reactor from a bottom side and enters a tube-side of the steam super-heater 201, which enters the waste heater boiler 202 where heat is utilized to produce saturated steam. The saturated steam from the waste heat boiler superheated in a shell side of the steam super-heater 201. The gas stream exits from the waste heat boiler and enters the supply water heater 203, recycle gas heat exchanger 204, water cooler 205, refrigeration exchanger 206, first ammonia chiller 207 and second ammonia chiller 208 where it is cooled down stepwise through the process. The gas stream enters a horizontal ammonia separator 209 where the liquid ammonia is separated out. The liquid ammonia enters the liquid ammonia tank 201. The cold gas stream from the ammonia separator enters refrigeration exchanger 201 for refrigeration exchange, which is pressurized in the recycle compressor, converges with incoming make-up gas, enters the recycle gas heat exchanger and is heated before entering the ammonia reactor, where the loop completes.

SUMMARY

In one embodiment, an ammonia synthesis system and process, comprising: ammonia synthesis reactor, integrated waste beat boiler, supply water heater, recycle gas heat exchanger, water cooler, integrated ammonia chiller and refrigeration exchanger, secondary ammonia chiller, ammonia separator, liquid ammonia tank, recycle compressor and start-up heater. Process gas is heated in the heat exchanger and enters the ammonia synthesis reactor, then enters the integrated waste heat boiler. The reacted gas stream exits from the bottom of the waste heat boiler and gets cooled in the supply water heat exchanger. Then the gas stream enters the recycle gas heat exchanger, water cooler, integrated ammonia chiller and refrigeration exchanger, secondary ammonia chiller, gets cooled step by step, and enters the ammonia separator. The liquid ammonia that gets separated from the gas stream enters the liquid ammonia tank. The cooled gas stream enters the integrated ammonia chiller and refrigeration exchanger and gets pressurized and become recycle gas.

In another embodiment, the ammonia synthesis system may further comprise, an external high pressure vessel shell having an internal chamber and an internal vessel, the internal vessel comprises, a first catalyst bed, a second catalyst bed, and a third catalyst bed, wherein the first catalyst bed may have an indirect gas-gas heat exchanger with gas inlets and outlets, the second catalyst bed has a direct gas-gas heat exchanger with gas inlets and outlets, the third catalyst bed may be an adiabatic bed and the internal chamber of the external high pressure vessel shell contains an catalyst basket having an annulus space between the catalyst basket and the external high pressure vessel shell.

In a further embodiment, the ammonia synthesis system may further comprise a second catalyst bed central gas distributer pipe that connects the second catalyst bed and the third catalyst bed.

In yet another embodiment, the ammonia synthesis system may further comprise a central gas collector pipe having a top end in the internal chamber of the high pressure vessel shell, a bottom end extends outside of high pressure vessel shell and a start-up heater connection pipe located at the top end of the high pressure vessel shell.

In yet a further embodiment, the ammonia synthesis system wherein, the start-up heater connection pipe is located the top of the high pressure vessel shell to preheat the start-up heater and preheat a catalyst un-load pipe located on a bottom of high pressure vessel shell.

In still another embodiment, the ammonia synthesis system further comprising an external shell comprising, an internal chamber, a top cover, a bottom header, a cold gas outlet chamber, a warm gas inlet chamber, a liquid ammonia outlet area, a liquid ammonia inlet area, a cold gas inlet chamber, an inner tube, an outer tube and a warm gas outlet chamber, and wherein, the cold gas inlet chamber is connected to cold gas outlet through the inner tube, the inner tube and the outer tube are co-concentric, the inner tube extends through the warm gas inlet chamber, the cold gas inlet chamber is disposed inside the warm gas outlet chamber, the outer tube extends through the liquid ammonia outlet area and the liquid ammonia inlet area, the cold gas outlet chamber is connected to cold gas outlet, the warm gas inlet chamber is connected to warm gas inlet, the liquid ammonia outlet area may have an outlet, the liquid ammonia inlet area may have an inlet, the cold gas inlet chamber may have an inlet and the warm gas outlet chamber may have an outlet.

In still a further embodiment, the ammonia synthesis system comprising an integrated ammonia chiller and refrigeration exchanger wherein the inner tube connects an inner tube upper tube-sheet and an inner tube lower tube-sheet, the outer tube connects an outer tube upper tube-sheet and an out tube lower tube-sheet, the inner tube upper-tube sheet may be located between the cold gas outlet chamber and warm gas inlet chamber, the inner tube lower tube-sheet is located between the cold gas inlet chamber and warm gas outlet chamber, the outer tube upper tube-sheet is located between the warm gas inlet chamber and liquid ammonia outlet area, the outer tube lower tube-sheet is located between the liquid ammonia inlet area and the warm gas outlet chamber, an unreacted gas stream from the recycle gas heat exchanger enters the ammonia synthesis reactor, the reacted gas stream exits the ammonia synthesis reactor, enters the integrated waste heat boiler where the heat is utilized to generate steam, the gas stream exits the integrated waste heat boiler and is cooled through heat transfer to the supply water heat exchanger, enters, the recycle gas heat exchanger, water cooler, integrated ammonia chiller and refrigeration exchanger, secondary ammonia chiller, the gas stream enters the ammonia separator to form separated liquid ammonia and the liquid ammonia that is separated from the ammonia separator enters the liquid ammonia tank, a cold gas stream from the ammonia separator enters the integrated ammonia chiller and refrigeration exchanger where the cold gas stream enters the exchanger refrigeration with a warm gas stream, is pressurized by the recycle compressor, and converges with incoming make-up gas, enters the recycle gas heat exchanger to be preheated and enters the ammonia synthesis reactor.

In another embodiment, the ammonia synthesis system wherein a partial stream of effluent from the recycle gas heat exchanger is sent to the start-up heater to increase a temperature of the catalyst bed.

In yet another embodiment, the ammonia synthesis system wherein the effluent from the recycle gas heat exchanger is connected to the integrated waste heat boiler at least one of internally and externally.

DETAILED DESCRIPTION

Figure 1:
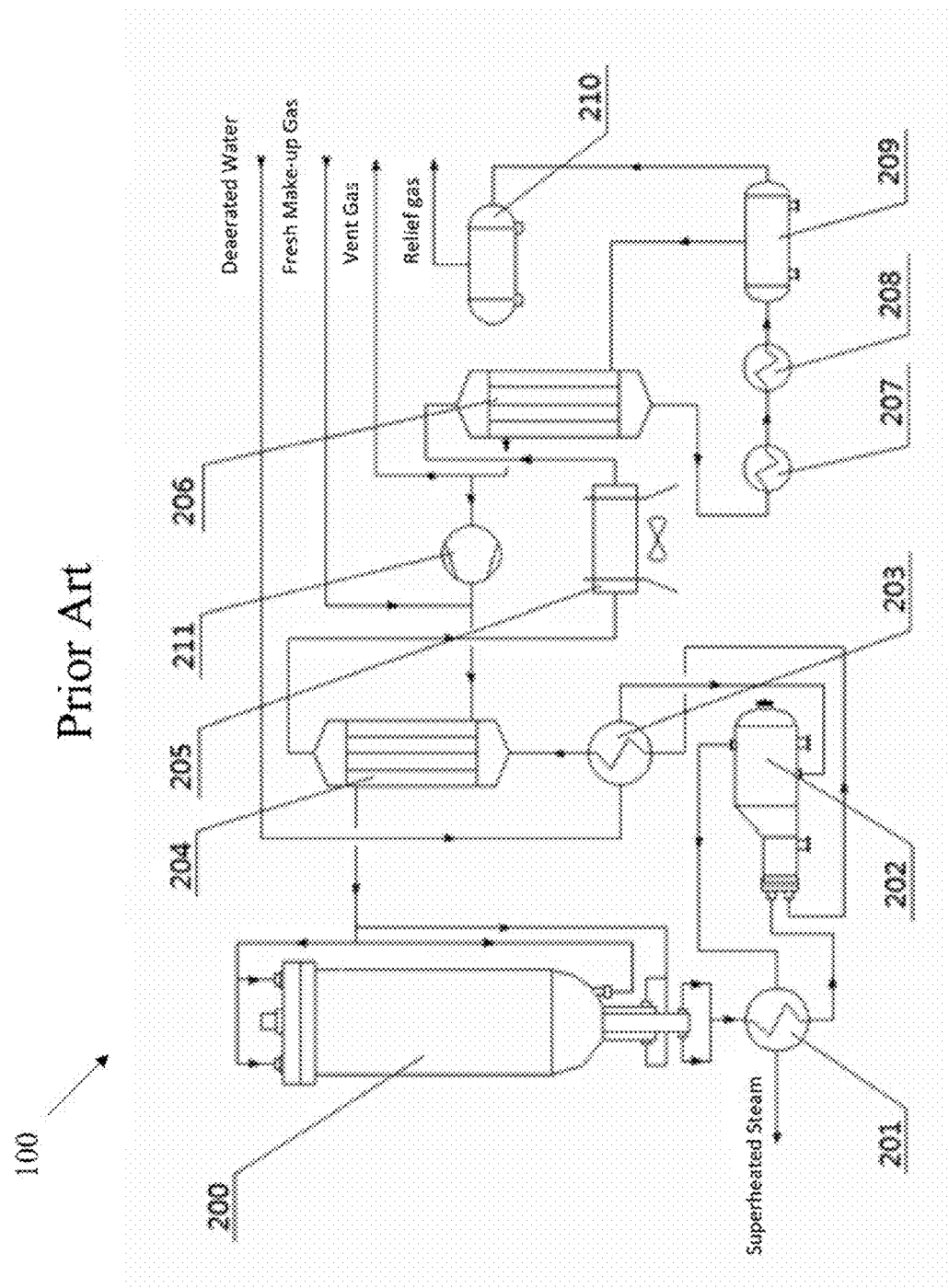
FIG. 1 illustrates a prior art ammonia synthesis process.

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

Ammonia synthesis systems of the instant disclosure may have an internal indirect-cooling heat exchanger that may because of space limitations contain an increased amount of catalyst, thus improving unit production of the reactor.

The ammonia synthesis system of the instant disclosure may have a reduced number of components which may result in a lower pressure drop and lower energy consumption of the process.

The ammonia synthesis process of the instant disclosure may be modified by increasing the catalyst utilization per unit volume resulting in a net increase in ammonia concentration through the reactor.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily refer to the same group of examples, and the described features, structures, or characteristics may be combined in any suitable manner in one or more examples.

In one embodiment of the ammonia synthesis system may comprise an ammonia synthesis reactor, an integrated waste heat boiler, a supply water heater, a recycle gas heat exchanger, a water cooler, an integrated ammonia chiller and refrigeration exchanger, a secondary ammonia chiller, an ammonia separator, a liquid ammonia tank, a recycle compressor and a start-up heater. Process gas may be heated in the heat exchanger and enter the ammonia synthesis reactor, which enters the integrated waste heat boiler. The reacted gas stream may exit from the bottom of the waste heat boiler and cooled in the supply water heat exchanger. The gas stream may enter the recycle gas heat exchanger, water cooler, integrated ammonia chiller and refrigeration exchanger, secondary ammonia chiller, to be cooled stepwise through the process. The gas may enter the ammonia separator. The liquid ammonia is separated from the gas stream may enter the liquid ammonia tank. The cooled gas stream may enter the integrated ammonia chiller and refrigeration exchanger and be pressurized as the recycle gas.

In one embodiment of the ammonia reactor in the ammonia synthesis system comprises an external high pressure vessel shell with an internal chamber and an internal vessel. The internal vessel may comprise, from top to bottom, a first catalyst bed, a second catalyst bed and a third catalyst bed. The first catalyst bed may have an indirect gas-gas heat exchanger with gas inlets and outlets. The second catalyst bed may have a direct gas-gas heat exchanger with gas inlets and gas outlets. The third catalyst bed may be an adiabatic bed. The internal chamber within the external high pressure vessel shell may contain the catalyst basket and there may be an annulus space between the catalyst basket and the high pressure vessel shell.

In one embodiment of the ammonia synthesis system may utilize a connecting pipe on the top of the high pressure vessel shell for a start-up heater and catalyst un-load pipe on the bottom of high pressure vessel shell.

In one embodiment of the instant disclosure the integrated ammonia chiller and refrigeration exchanger in the ammonia synthesis system may comprise an external shell with an internal chamber, a top cover and a bottom header. The ammonia chiller and refrigeration exchanger may have a cold gas outlet chamber, a warm gas inlet chamber, a liquid ammonia outlet area, a liquid ammonia inlet area, a cold gas inlet chamber and a warm gas outlet chamber. The cold gas inlet chamber may be connected to cold gas outlet through the inner tube, the inner tube and the outer tube may be co-concentric. The inner tube may extend through the warm gas inlet chamber. The cold gas inlet chamber may be contained within the warm gas outlet chamber, the outer tube may extend through the liquid ammonia outlet area, liquid ammonia inlet area, the cold gas outlet chamber may be connected to cold gas outlet, the warm gas inlet chamber may be connected to warm gas inlet, the liquid ammonia outlet area may have an outlet, liquid ammonia inlet area may have an inlet. The cold gas inlet chamber may have an inlet and the warm gas outlet chamber may have an outlet.

The integrated ammonia chiller and refrigeration exchanger in the ammonia synthesis system comprises an inner tube connected to an inner tube upper tubesheet and the inner tube lower tubesheet. The outer tube connects the outer tube upper tubesheet and outer tube lower tubesheet. The inner tube upper tubesheet is located between the cold gas outlet chamber and warm gas inlet chamber. The inner tube lower tubesheet is located between the cold gas inlet chamber and warm gas outlet chamber. The outer tube upper tubesheet is located between the warm gas inlet chamber and liquid ammonia outlet area. The outer tube lower tubesheet is located between the liquid ammonia inlet area and the warm gas outlet area.

The unreacted gas stream from the recycle gas heat exchanger enters the ammonia synthesis reactor. The reacted gas stream exits the ammonia synthesis reactor, enters the directly-connected integrated waste heat boiler where heat is utilized to generate steam and The gas stream exits the waste heat boiler and is further cooled down through heat transfer to the supply water heater, and enters the recycle gas heat exchanger, water cooler, integrated ammonia chiller and refrigeration exchanger, secondary ammonia chiller, and is cooled down stepwise through the process. The gas stream may enter the ammonia separator for the separation of liquid ammonia.

The liquid ammonia may be separated by the ammonia separator and may enter the liquid ammonia tank. The cold gas stream from the ammonia separator enters the integrated ammonia chiller and refrigeration exchanger where the cold gas stream exchanges refrigeration with the warm gas stream, which is then pressurized in the recycle compressor, converge with incoming make-up gas and enters the recycle gas heat exchanger to be preheated and enters the ammonia synthesis reactor completes the loop.

The ammonia synthesis system has a partial stream of the recycle gas heat exchanger effluent sent to start-up heater for a temperature increase of the catalyst bed.

The ammonia reactor 20 in the ammonia synthesis system may have two cooling heat exchangers, one is the indirect-cooling heat exchanger 6 in the first catalyst bed 4, and the other is the fin-type in-direct gas-gas heat exchanger 11 at the outer circular space inside the second catalyst bed 9. Catalyst beds in the reactor may be divided by the two cooling heat exchangers into four stages. This design may improve catalyst capacity resulting in an increase in production capacity. Also, a four stage reaction configuration may more closely align to an optimal reaction temperature curve (highest reaction rate curve), resulting in a net increase of ammonia concentration through reactor by as much as 1 mol%. The reaction process may thus be simplified, resulting in reaction temperatures that are more easily controlled.

The reactor bottom has a 3-way-path union area exposed to high temperature 400° C. and above and high pressure condition 12 MPa and above. The center of the 3-way-path union may be connected to reactor outlet where the high-temperature reaction gas stream passes. Although the high pressure is exerted upon the 3-way-path union, it is protected from the high temperature conditions because the outside of union is surrounded by the un-reacted cold gas, for the safe operation of the reactor.

The annulus space located between the high-pressure shell vessel and the internal vessel is filled with room temperature unreacted gas. This cold-wall reactor design may reduce insulation material and therefore construction material cost.

The reactor design of the instant disclosure may result in a higher catalyst loading volume. Therefore, since more catalyst may be loaded in reactor of a given reactor diameter, resulting in a net ammonia concentration increase through the reactor and production output increase.

IMPLEMENTATION EXAMPLES

Figure 2:
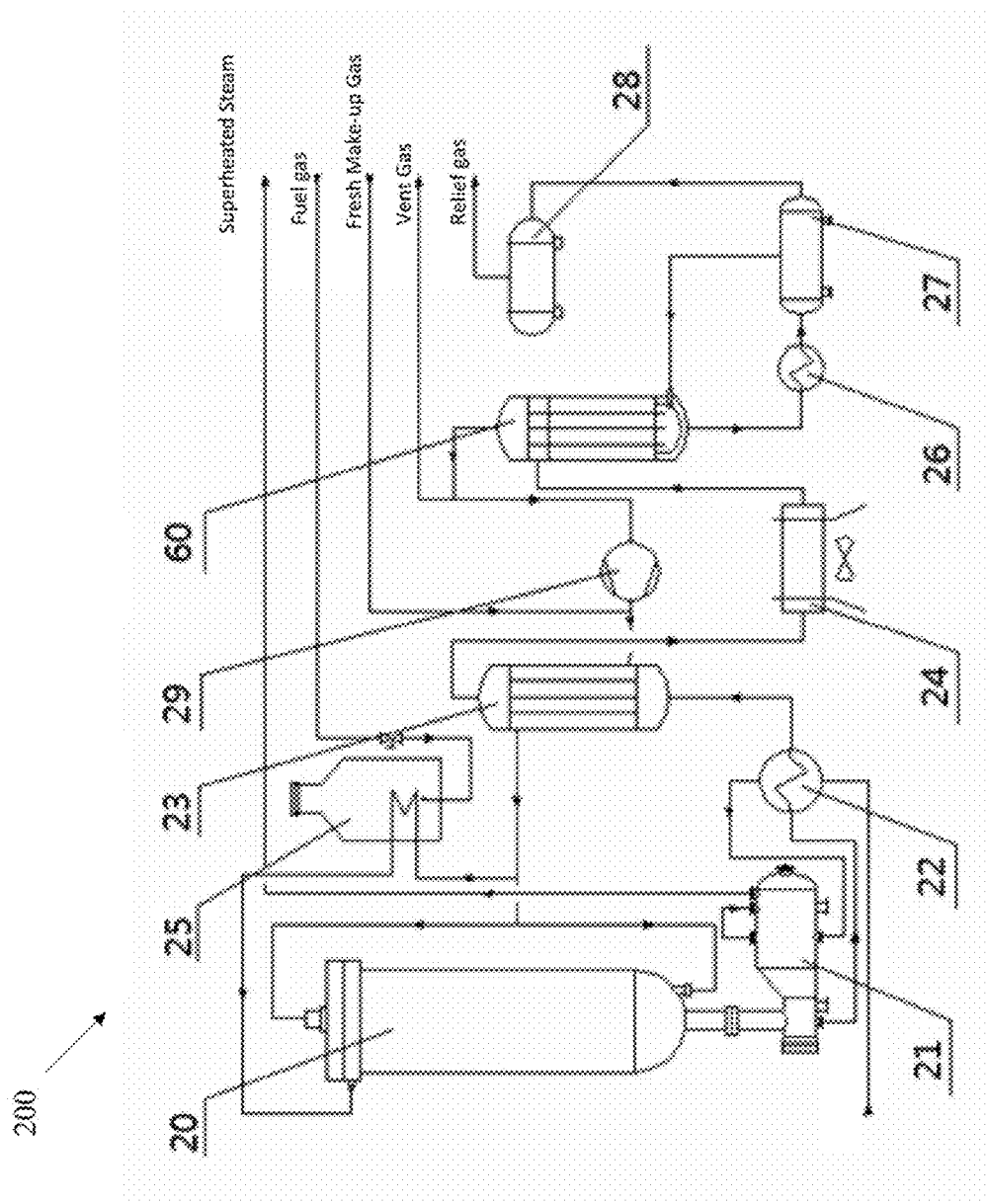
FIG. 2 illustrates the ammonia synthesis system for practicing an embodiment of the disclosure.

As shown in FIG. 2, in one embodiment of the ammonia synthesis system and process, comprises an ammonia synthesis reactor 20, an integrated waste heat boiler 21, a supply water heater 22, a recycle gas heat exchanger 23, a water cooler 24, an integrated ammonia chiller and refrigeration exchanger 60, a secondary ammonia chiller 26, an ammonia separator 27, a liquid ammonia tank 28, a recycle compressor 29 and a start-up heater 25.

Process gas may be heated in the heat exchanger 23 and enter the ammonia synthesis reactor 20, directly entering the integrated waste heat boiler 21 without going through an additional external pipe. The reacted gas stream may exit from the bottom of the waste heat boiler and be cooled in the supply water heat exchanger 22. The gas stream may enter the recycle gas heat exchanger 23, water cooler 24, integrated ammonia chiller and refrigeration exchanger 60, secondary ammonia chiller 26, to be cooled stepwise throughout the process, and enter the ammonia separator 27. The liquid ammonia that is separated from the gas stream may enter the liquid ammonia tank 28. The cooled gas stream may enter the integrated ammonia chiller and refrigeration exchanger 60 and be pressurized in the recycle compressor 29, converge with incoming make-up gas and enter the recycle gas heat exchanger 23 and he heated thus completing the loop.

During start-up, a partial stream of gas from the recycle gas heat exchanger 23 may enter the start-up heater through the top of the ammonia reactor and be heated. External fuel gas may be supplied to the start-up heater for heating purposes.

Figure 3:
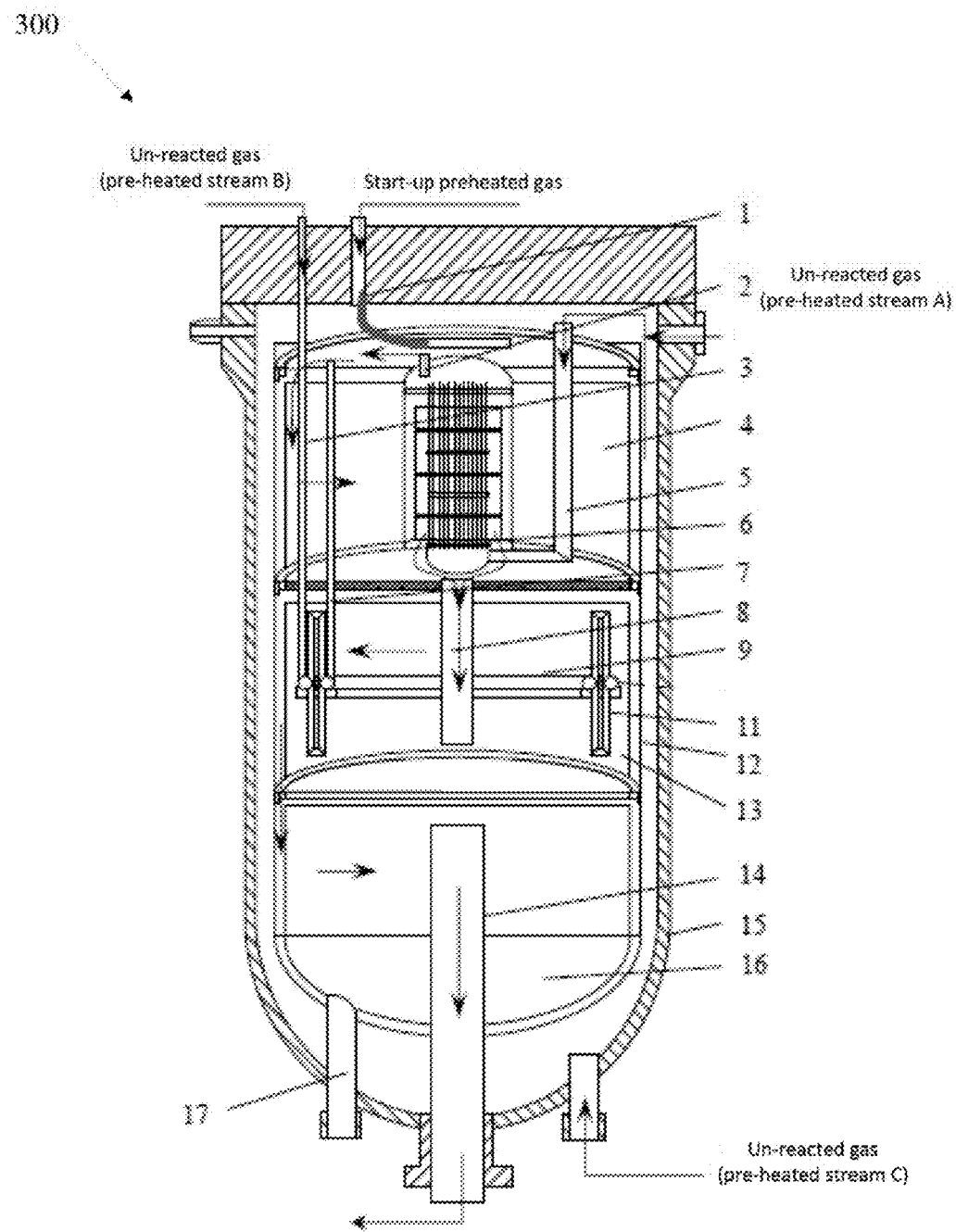
FIG. 3 illustrates an example ammonia reactor of the ammonia synthesis system for practicing an embodiment of the disclosure.
Figure 4:
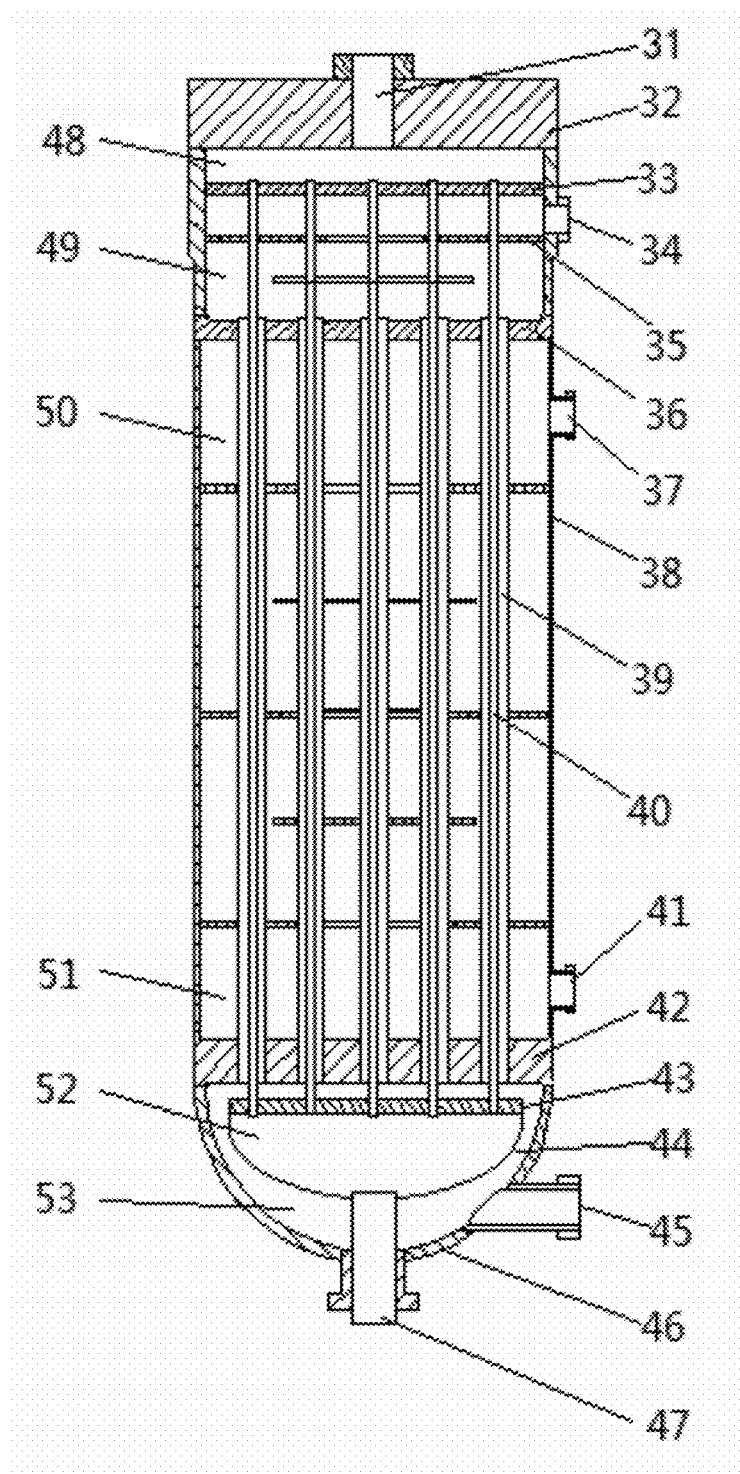
FIG. 4 illustrates an integrated ammonia chiller and refrigeration exchanger of the ammonia synthesis system for practicing an embodiment of the disclosure.

As shown in FIG. 3, the ammonia reactor 20 in the ammonia synthesis system may comprise an external high pressure vessel shell 15 with an internal chamber and an internal vessel. The catalyst basket 12 may be contained within the high pressure vessel shell. The internal vessel may comprise from top to bottom, a first catalyst bed 4, a second catalyst bed 9 and a third catalyst bed 16. The first catalyst bed 4 may have an indirect gas-gas heat exchanger 6 with a gas inlet pipe 5 and an outlet pipe 2. The second catalyst bed 9 may have a fin-type in-direct gas-gas heat exchanger 11 with a gas inlet pipe 3 and an outlet pipe 7. The third catalyst bed 16 may be an adiabatic bed. The internal chamber inside the external high pressure vessel shell may contain a catalyst basket 12. There may be an annulus space between the catalyst basket 12 and the high pressure vessel shell 15. The second catalyst bed central gas distributer pipe 8 may be separate from central gas collector pipe 14. The catalyst basket 12 may be separated from the high pressure vessel shell 15 by an annulus space. The second catalyst bed central gas distributer pipe 8 may connect the second catalyst bed 9 and the third catalyst bed 16. The top end of the central gas collector pipe 14 is located in the internal chamber of high pressure vessel shell 15. The bottom end may extend to the outside of high pressure vessel shell 15. The start-up heater connecting pipe 1 is located at the top of the high pressure vessel shell 15. A catalyst un-load pipe 17 may be at the bottom of the high pressure vessel shell 15.

The flow process inside the ammonia synthesis reactor 20 is as the following, the feed gas may be split into three streams A, B and C. Streams A and B are pre heated to 150° C.~170° C. outside of the reactor. The smaller stream C may enter the reactor from the bottom, moving upwards in the annulus space between the high pressure vessel shell 15 and catalyst basket 12 and being heated while it is traversing the annular space. Inside the ammonia synthesis reactor, stream C converges with pre-heated stream A. The combined stream goes through the inlet pipe 5 into the shell side of the in-direct gas-gas heat exchanger 6, travelling upwards and heated to 340° C.~380° C. to outlet pipe 2, which reaches the top of first catalyst bed 4. Stream B may enter into the reactor from the top and move directly through the inlet pipe 3 into the fin-type in-direct gas-gas heat exchanger.

Stream A and B may converge at the top of the first catalyst bed 4 and flow radially inward in the catalyst bed. The gas steam may absorb the evolved reaction thermal energy and the temperature may increase. The hot gas stream may enter the shell side of the in-direct heat exchanger 6, the un-reacted cold gas steam may enter the tube side and exchange heat with the hot gas. Cooled gas streams flow downward to a central gas distributer pipe 8 and may flow radially outward, the cooled gas streams first reach the center reaction area of the catalyst bed 9 and then reach the circumferential area which is the fin-typed indirect gas to gas heat exchange area 13 in the second catalyst bed 9. The gas stream may flow radially inward in the third catalyst bed 16 where it reaches a temperature of 420° C.~450° C. and ammonia concentration 18 mol%~20 mol% and flows to the central gas collector pipe 14 and exit the reactor.

The reactor designs of the present disclosure encompass at least two variants, one in which the effluent flow directly into a connected integrated waste heat boiler without external pipe connection and the other in which the effluent flows to a waste heat boiler through external connecting pipes. When it is time for a catalyst change. After the system is shut down, the bottom cover of the catalyst unload pipe 17 may be opened. Catalyst may be unloaded by the force of gravity.

The integrated ammonia chiller and refrigeration exchanger 60 may comprise an external shell 38 with an internal chamber, top flat cover 32 and bottom ball-shaped header 46. The integrated ammonia chiller and refrigeration exchanger having a cold gas outlet chamber 48, a warm gas inlet chamber 49, a liquid ammonia outlet area 50, a liquid ammonia inlet area 51, a cold gas inlet chamber 52 and a warm gas outlet chamber 53.

The cold gas inlet chamber 52 may be connected to cold gas outlet 48 through an inner tube 40, with the inner tube 40 and the outer tube 39 are co-concentric. The inner tube 40 may extend through the warm gas inlet chamber 49. The cold gas inlet chamber 52 may be contained within the warm gas outlet chamber 53. The outer tube 39 may extend through the liquid ammonia outlet area 50 and liquid ammonia inlet area 51. The cold gas outlet chamber 48 may be connected to cold gas outlet 31. The warm gas inlet chamber 49 may be connected to the warm gas inlet 34. The warm gas inlet chamber 48 may have a baffle 35 which makes the gas entering warm gas inlet chamber 49 change flow path.

Liquid ammonia outlet area 50 may have an outlet 37 and liquid ammonia inlet area 51 having an inlet 41 so that the liquid ammonia may flow in and out. The inner tube 40 connects the inner tube upper tubesheet 33 and the inner tube lower tubesheet 43. The outer tube 39 connects the outer tube upper tubesheet 36 and outer tube lower tubesheet 42. The inner tube upper tubesheet 33 may be located between the cold gas outlet chamber 48 and warm gas inlet chamber 49. The inner tube lower tubesheet 43 may be located between the cold gas inlet chamber 52 and warm gas outlet chamber 53. The outer tube upper tubesheet 36 may be located between the warm gas inlet chamber 49 and liquid ammonia outlet area 50. The outer tube lower tubesheet 42 may be located between the liquid ammonia inlet area 51 and the warm gas outlet area 53. The tubesheets serve to separate the chambers. The cold gas inlet chamber 52 may be connected to cold gas inlet 47 and have elliptical header 44 at the bottom. The warm gas inlet chamber 53 may be connected to warm gas inlet 46 for warm gas to flow in.

The fluid flows in the integrated ammonia chiller and refrigeration 60 may be described as having warm gas from the water cooler flowing into the warm gas inlet 34 to warm the gas inlet chamber 49 and change flow path due to the baffle. The warm gas may exchange refrigeration with the cold gas within the inner tube 40. The gas may enter the circular space between the outer tube 39 and inner tube 40 flowing downwardly. The liquid ammonia outside of the outer tube 39 cools down the gas steam in the circular space causing part of the gas stream to condense. The gas-liquid mix moves within the space between the ball-shaped header 46 and elliptical header 44 to the warm gas outlet 45 and exits to the 2nd ammonia chiller. The cold gas from the ammonia separator enters the cold gas inlet 47 and the inner tube 40, where it travels upwardly to the cold gas outlet at the top and exchanges refrigeration with the warm gas in the outer tube 39. Liquid ammonia may enter from the bottom liquid ammonia inlet 41 and travel in the area outside of the outer tube. The flow-path of the liquid ammonia may be directed by the baffles 35 and travel upwardly. Liquid ammonia may exchange refrigeration with the warm gas in the outer tube 39 and exit from the liquid ammonia outlet 37 at the top.

An integrated ammonia synthesis reactor, waste heat boiler and steam superheater 3-in-1 unit, comprises ammonia synthesis reactor (523) and waste heat boiler body (519) having one end being high pressure end. The high pressure end comprises high pressure cylindrical body (502) with a high pressure flange (508) on one side and a thick tubesheet (511) on the other. The thick tubesheet (511) separates the high pressure body (502) and the waste heat boiler body (519). There is a gas distribution box (506), inside the high pressure body (502). Connection pipe (507) has one end connected to the internal chamber of gas distribution box (506), the other end connected the ammonia synthesis reactor (523) outlet. The gas distribution box has the thin tubesheet (505) on the other end. The cold gas chamber has the thick tubesheet (511) on one end and the thin tubesheet (505) on the other end. The cold gas chamber has a reaction gas outlet (501). The waste heat boiler has a saturated steam chamber (528) and superheated steam chamber (529). The saturated steam chamber (528) and superheated steam chamber (529) are separated by radial-direction plate (516) and axial-direction plate (514). The chamber between the radial-direction plate (516) and thick tubesheet (511) is the saturated steam chamber. The axial-direction plate between the saturated steam chamber and the superheated steam chamber has a de-mist screen (515). The superheated steam chamber (529) has superheated steam outlet (520). The saturated steam chamber (528) has water inlet (503) and multiple triple tube sets are contained within the waste heat boiler body (519). Each set has an outer tube (512) and a double inner tube (513). The triple tubes are concentric and there is a circular space in between each tube in the set. A certain number of triple tube sets are of longer length and run through the saturated steam chamber (528), to the superheated steam chamber (529) and through the radial direction plate (16) with the closed-up outer tube end (512) inside the superheated steam chamber (529). A certain number of triple tube sets are of shorter length inside the saturated steam chamber (528). The outer tubes have one end secured on the thick tubesheet (511) and connected with the cold gas chamber (527), the double inner tubes have one end secured on the thin tubesheet (505) and are connected to the internal chamber of gas distribution box (506). The open end of the double inner tube (513) is located within the closed-up outer tube (512) with space inbetween.

Figure 5:
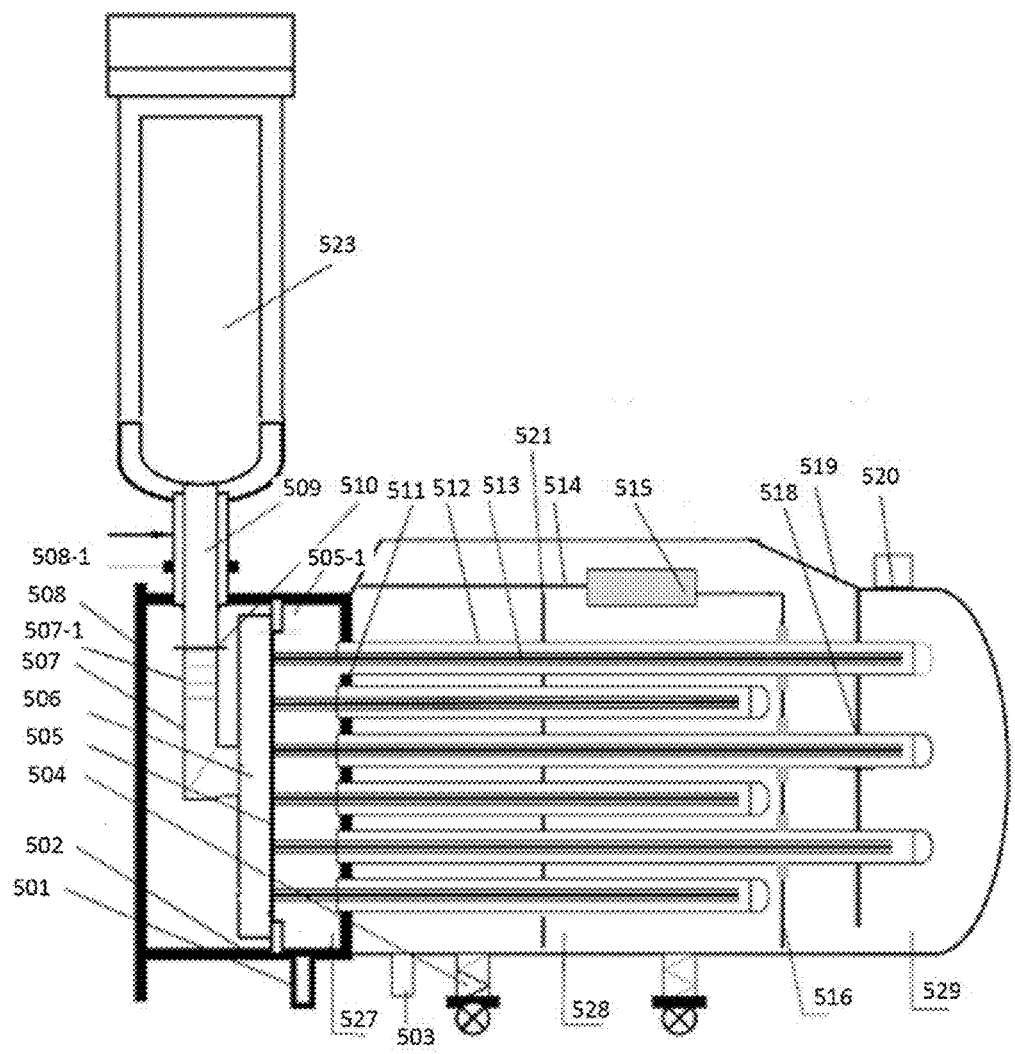
FIG. 5 illustrates an integrated ammonia synthesis reactor, waste heat boiler and steam superheater of the ammonia synthesis system for practicing an embodiment of the disclosure.
Figure 6:
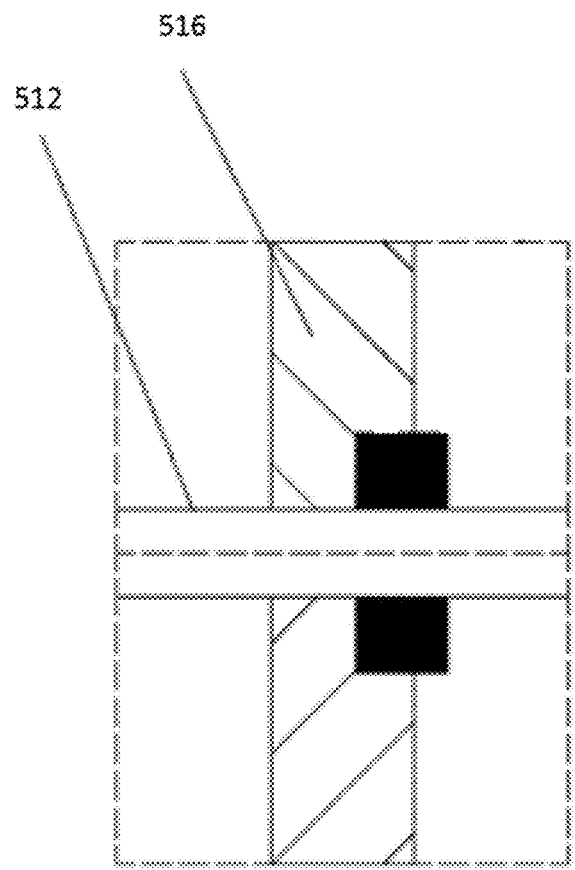
FIG. 6. illustrates a detachable seal between the outer tubes and the orifices on the radial direction plate.

The working process of this equipment has the high temperature gas stream from the exothermic reaction in ammonia synthesis reactor 523 exits the bottom of the ammonia synthesis reactor and enters the high pressure gas distribution box (hot gas chamber) 506 and the double inner tubes 513. The gas stream travels from left to right as shown in FIG. 5, then it doubles back in the circular space between the inner tube 513 and outer tube 512 to the cold gas chamber 527 and exits at gas outlet 501. Water enters from water inlet 503 to the saturated steam chamber and exchanges heat with outer tubes. Saturated steam is generated, rises up, runs through de-mist screen 515 and enters the superheated steam chamber. The outer tubes in the superheated steam chamber heat up the saturated steam to superheated steam, which exit from steam outlet 520. The ammonia synthesis reactor and the waste heat boiler of this device may be connected directly by flanges and through high temperature piping.

The triple tubes of shorter length of this device are configured horizontally in the saturated steam chamber, the triple tubes of longer length runs through the saturated steam chamber and further into the superheated chamber. The function of the double inner tubes is for directing flow, not for heat exchanging, thus the gas entering the outer tubes are of high temperature, the function of the outer tube is for heat exchange.

The waste heat boiler that generates saturated steam and the steam superheater in this device are one piece of equipment, which is connected with a 3-way union at the bottom of the ammonia synthesis reactor.

In the 3-in-1 unit, there is de-mist screen 515 that connects the saturated steam chamber and superheated screen chamber, which maintain the saturated steam in a dry condition. Steam having a differential pressure as high as 100 Mpa may be generated. The waste heat boiler and the steam superheater may be separated, with different reaction gases as the heat source.

In the 3-in-1 unit, construction material may be saved by approximately ⅓rd due to the fact that ammonia synthesis reactor, waste heat boiler and steam superheated are integrated. The structural characteristics prevent mechanical failure due to differential temperature stress, therefore ensuring operational reliability. The thin tubesheet and double inner tube bundle may be horizontally removed for easy maintenance and repair. The 3-in-1 unit configuration reduces heat loss and improves heat recovery by 5 to 8%, while reducing the footprint by $\frac{1}{3}^{rd}$.

Case 1: An integrated ammonia synthesis reactor, waste heat boiler and steam superheater 3-in-1 unit, comprises ammonia synthesis reactor (523) and waste heat boiler body (519). The waste heat boiler body (519) has one end being high pressure end that comprises high pressure cylindrical body (502) with a high pressure flange (508) on one side and a thick tubesheet (511) on the other. The thick tubesheet (511) separates the high pressure body (502) the waste heat boiler body (519). There is a gas distribution box (506), inside the high pressure body (502). Connection pipe (507) has one end connected to the internal chamber of gas distribution box (506) and the other end connected to the ammonia synthesis reactor 523 outlet. The gas distribution box has the thin tubesheet (505) on the other end. The cold gas chamber has the thick tubesheet (511) on one end and the thin tubesheet (505) on the other end. The cold gas chamber has a reaction gas outlet (501). The waste heat boiler has a saturated steam chamber (528) and superheated steam chamber (529) separated by radial-direction plate (516) and axial-direction plate (514). The chamber between the radial-direction plate (516) and thick tubesheet (511) is the saturated steam chamber. The axial-direction plate between the saturated steam chamber and the superheated steam chamber has a de-mist screen (515). The superheated steam chamber (529) has a superheated steam outlet (520). The saturated steam chamber (528) has a water inlet (503). Multiple triple tube sets are located within the waste heat boiler body (519). Each set has an outer tube (512) and a double inner tube (513). The triple tubes are concentric with a circular space inbetween each tube in the set. A portion of the triple tube sets are of longer length and run through the saturated steam chamber (528), to the superheated steam chamber (529) and through the radial direction plate (16) with the closed-up outer tube end (512) inside the superheated steam chamber (529). A portion of the triple tube sets are of shorter length inside the saturated steam chamber (528). The outer tubes have one end secured on the thick tubesheet (511) and connected with the cold gas chamber (527), the double inner tubes have one end secured on the thin tubesheet (5) and connected with the internal chamber of gas distribution box (506). The other open end of the double inner tube (513) are located inside the closed-up outer tube (512) with space inbetween.

There is at least one baffle plate in the superheated steam chamber. A seal between the inner double tubes and the orifices on the thin tubesheet may be made of graphite with crew nuts, which creates a detachable seal. The inner double tube set may be removed for maintenance and repair. The connection of 3-way union of ammonia synthesis reactor 523 and the high pressure cylinder body 502 may be via high pressure flange 508-1. There may be 1 to 4 spring support seats 504 with supporting wheels underneath. High pressure flange 508-1 may be opened for maintenance and repair, and the steam superheater may be removed from the supporting columns.

Case 2: Equipment structure is similar to that of case 1. Reaction gas from ammonia synthesis ammonia synthesis reactor 523 with temperature of 455~460° C. enters the gas distribution box, then into the inner double tubes 513 as shown in FIG. 5 travelling from left to right. The reaction gas reaches outer tuber 512, traveling from right to left to the low temperature gas chamber 527 with a temperature dropped to 270~280° C., which exits from gas outlet 501.

Desalted water enters from water inlet 3 into the saturated chamber of waste heat boiler generates 3.9~5.0Mpa with a temperature of 420° C.~430° C. saturated steam, this steam rises up through de-mist screen 515 and enters superheated chamber 529, where it absorbs heat and reaches temperature of 420° C.~430° C., the steam exits the steam outlet 523.

Although an exemplary example of at least one of the system, method, and non-transitory computer readable medium of the present disclosure has been illustrated in the accompanied drawings and described in the following detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems may be performed by one or more of the modules or components described herein or in a distributed architecture.

While preferred examples of the present disclosure have been described, it is to be understood that the examples described are illustrative only and the scope of the disclosure is to be defined solely by the appended claims when considered with a full range of equivalents and modifications (e.g., protocols, hardware devices, software platforms etc.) thereto.

What is claimed is:

1. An ammonia synthesis system comprising:
   an ammonia synthesis reactor;
   an integrated waste heat boiler;
   a supply water heat exchanger;
   a recycle gas heat exchanger;
   a water cooler;
   an integrated ammonia chiller and refrigeration exchanger;
   a secondary ammonia chiller;
   an ammonia separator;
   a liquid ammonia tank;
   a recycle compressor and
   a start-up heater;
   and wherein,
      a process gas is heated in the recycle gas heat exchanger and enters the ammonia synthesis reactor and the integrated waste heat boiler,
      a reacted gas stream exits from a bottom of the integrated waste heat boiler and is cooled in the supply water heat exchanger,
      a gas stream enters the recycle gas heat exchanger, the water cooler, the integrated ammonia chiller and refrigeration exchanger, the secondary ammonia chiller, and is cooled,
      the gas stream enters the ammonia separator to form a separated liquid ammonia,
      the separated liquid ammonia enters the liquid ammonia tank, and
      a cooled gas stream enters the integrated ammonia chiller and refrigeration exchanger for pressurization as recycle gas.

2. The ammonia synthesis system of claim 1, wherein the ammonia synthesis reactor further comprising:
   an external high pressure vessel shell having an internal chamber and an internal vessel;
   the internal vessel comprises;
      a first catalyst bed;
      a second catalyst bed; and
      a third catalyst bed; wherein
      the first catalyst bed has an indirect gas-gas heat exchanger with gas inlets and outlets;
      the second catalyst bed has a direct gas-gas heat exchanger with gas inlets and outlets;
      the third catalyst bed has an adiabatic bed; and
      the internal chamber of the external high pressure vessel shell contains a catalyst basket having an annulus space between the catalyst basket and the external high pressure vessel shell.

3. The ammonia synthesis system of claim 2, further comprising a second catalyst bed central gas distributer pipe that connects the second catalyst bed and the third catalyst bed.

4. The ammonia synthesis system of claim 3, further comprising,
   a central gas collector pipe having a top end in the internal chamber of the high pressure vessel shell, a bottom end extends outside of high pressure vessel shell, and
   a start-up heater connection pipe located at the top end of the high pressure vessel shell.

5. The ammonia synthesis system of claim 4, wherein,
   the start-up heater connection pipe is located the top of the high pressure vessel shell to preheat the start-up heater and preheat a catalyst un-load pipe located on a bottom of high pressure vessel shell.

6. The ammonia synthesis system of claim 5, wherein the integrated ammonia chiller and refrigeration exchanger further comprising an external shell comprising:
   an internal chamber;
   a top cover;
   a bottom header;
   a cold gas outlet chamber;
   a warm gas inlet chamber;
   a liquid ammonia outlet area;
   a liquid ammonia inlet area;
   a cold gas inlet chamber;
   an inner tube;
   an outer tube; and
   a warm gas outlet chamber;
   and wherein,
      the cold gas inlet chamber is connected to cold gas outlet through the inner tube,
      the inner tube and the outer tube are co-concentric,
      the inner tube extends through the warm gas inlet chamber,
      the cold gas inlet chamber is disposed inside the warm gas outlet chamber,
      the outer tube extends through the liquid ammonia outlet area and the liquid ammonia inlet area,
      the cold gas outlet chamber is connected to cold gas outlet,
      the warm gas inlet chamber is connected to warm gas inlet,
      the liquid ammonia outlet area has an outlet,
      the liquid ammonia inlet area has an inlet,
      the cold gas inlet chamber has an inlet and
      the warm gas outlet chamber has an outlet.

7. The ammonia synthesis system of claim 6, wherein
   the inner tube connects an inner tube upper tube-sheet and an inner tube lower tube-sheet;
   the outer tube connects an outer tube upper tube-sheet and an out tube lower tube-sheet;
   the inner tube upper tube-sheet is located between the cold gas outlet chamber and warm gas inlet chamber;
   the inner tube lower tube-sheet is located between the cold gas inlet chamber and warm gas outlet chamber;

the outer tube upper tube-sheet is located between the warm gas inlet chamber and liquid ammonia outlet area;

the outer tube lower tube-sheet is located between the liquid ammonia inlet area and the warm gas outlet chamber;

an unreacted gas stream from the recycle gas heat exchanger enters the ammonia synthesis reactor;

the reacted gas stream exits the ammonia synthesis reactor, enters the integrated waste heat boiler where the heat is utilized to generate steam;

the gas stream exits the integrated waste heat boiler and is cooled through heat transfer to the supply water heat exchanger, enters, the recycle gas heat exchanger, water cooler, integrated ammonia chiller and refrigeration exchanger, secondary ammonia chiller, the gas stream enters the ammonia separator to form separated liquid ammonia; and the liquid ammonia that is separated from the ammonia separator enters the liquid ammonia tank, a cold gas stream from the ammonia separator enters the integrated ammonia chiller and refrigeration exchanger where the cold gas stream enters the exchanger refrigeration with a warm gas stream, is pressurized by the recycle compressor, and converges with incoming make-up gas, enters the recycle gas heat exchanger to be preheated and enters the ammonia synthesis reactor.

8. The ammonia synthesis system of claim 7, wherein a partial stream of effluent from the recycle gas heat exchanger is sent to the start-up heater to increase a temperature of the start-up heater.

9. The ammonia synthesis system of claim 8, wherein the effluent from the recycle gas heat exchanger is connected to the integrated waste heat boiler at least one of internally and externally.

10. The ammonia synthesis system of claim 1, wherein the ammonia synthesis reactor and the integrated waste heat boiler are integrated, further comprising:

a waste heat boiler body having a high pressure cylindrical body with a high pressure flange on one side and a thick tubesheet on the other, wherein the waste heat boiler body and the ammonia synthesis reactor having a high pressure end, the thick tubesheet separates the high pressure body and the waste heat boiler body, the waste heat boiler comprising a superheated steam chamber separated from a saturated steam chamber by a radial-direction plate and an axial-direction plate, the chamber between the radial-direction plate and the thick tubesheet is the saturated steam chamber, the superheated steam chamber has a superheated steam outlet, the saturated steam chamber has a water inlet and multiple triple tube sets are contained within the waste heat boiler body, the multiple tube sets have an outer tube and a double inner tube, the triple tubes are concentric with a circular space therebetween, a portion of the triple tube sets are of longer length and run through the saturated steam chamber, to the superheated steam chamber and through the radial direction plate with a closed-up outer tube end inside the superheated steam chamber, another portion of the triple tube sets are of shorter length within the saturated steam chamber, an open end of the double inner tube is located within the closed-up outer tube with space therebetween;

a gas distribution box within the high pressure body having a thin tubesheet on one end, wherein the double inner tubes have one end secured to the thin tubesheet and are connected to an internal chamber of the gas distribution box;

a connection pipe having one end connected to an internal chamber of gas distribution box opposite the side having the thin tubesheet and a connection pipe other end connected to an ammonia synthesis reactor outlet;

a cold gas chamber has the thick tubesheet on one end and the thin tubesheet on the other end and has a reaction gas outlet, wherein the outer tubes have one end secured to the thick tubesheet and are connected to the cold gas chamber; and a de-mist screen located on the axial-direction plate between the saturated steam chamber and the superheated steam chamber.

\* \* \* \* \*